United States Patent Office 2,814,929
Patented Dec. 3, 1957

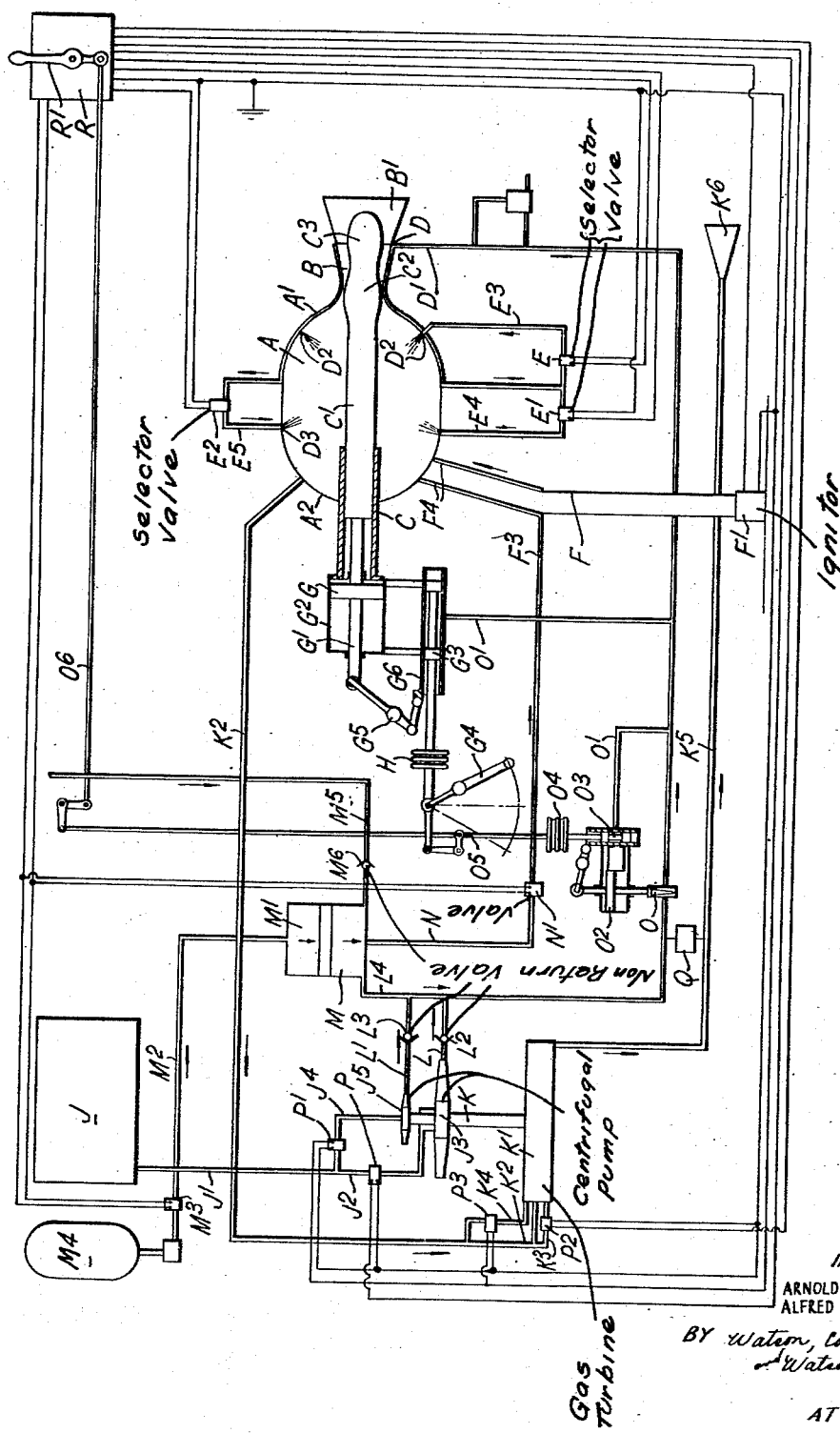

2,814,929

FUEL SUPPLY CONTROL FOR ROCKET TYPE JET PROPULSION UNITS

Arnold William Morley, Ruislip, and Alfred Robert Mortimer, Ickenham, England, assignors to D. Napier & Son Limited, London, England, a company of Great Britain Application February 3, 1953, Serial No. 334,798

Claims priority, application Great Britain February 7, 1952

2 Claims. (Cl. 60—35.6)

This invention relates to rocket type units hereinafter assumed to be jet propulsion units of the kind in which the motive power is derived at least mainly from a single liquid (hereinafter for convenience called a fuel) which is of a kind in which reaction between ingredients in the fuel in a reaction chamber can be initiated by submitting the fuel to an appropriate temperature with or without the assistance of a catalyst and can then be maintained with the development of gaseous products of reaction which are ejected from the chamber through a nozzle passage constituting or leading to a nozzle through which they are delivered with propulsive effect. The main fuel may in some cases have comparatively small quantities of one or more other liquids added to it in the reaction chamber to assist reaction and/or provide a subsidiary reaction.

It is desirable that the fuel used in such units shall be "safe" that is to say shall not be of a kind in which the reaction can be initiated at any temperature to which the fuel is liable to be exposed during transport, storage or in parts of the unit other than the interior of the reaction chamber during operation.

This presupposes use of a fuel which requires a comparatively elevated temperature to initiate and maintain the required reaction and one of the objects of the present invention is to provide a form of propulsion unit of the kind referred to which will meet to a satisfactory degree the problems and requirements which arise in the use of such a fuel.

In a jet propulsion power unit of the kind referred to according to the present invention comprising a reaction chamber in which reaction within the fuel delivered thereto is initiated and maintained with the production of gaseous products of reaction which are delivered through a nozzle passage constituting or leading to a propulsion nozzle through which the products of reaction pass with propulsive effect, means are provided for varying the effective cross sectional area of the nozzle passage in such manner as to maintain within the reaction chamber a pressure appropriate to satisfactory reaction and, under all working conditions, ensure that each particle of fuel remains for a sufficient time and under adequate temperature conditions within the reaction chamber to ensure the satisfactory completion of the reaction in such particle.

Thus it is important in order both to ensure the maintenance of reaction within the reaction chamber and to ensure efficient utilization of the fuel, that each particle of fuel after injection into the reaction chamber shall remain in the reaction chamber for a sufficient time and under adequate temperature conditions to ensure that it shall first be heated to the temperature at which reaction therein is initiated and shall then remain in the chamber until such reaction is substantially completed, thus avoiding loss of efficiency due to the ejection through the nozzle passage of a proportion of the fuel in an only partly decomposed condition.

Preferably means are provided for automatically varying the effective cross sectional area of the nozzle passage in accordance with the rate of supply of fuel to the reaction chamber so that the pressure maintained in the reaction chamber, the period during which each particle of fuel tends to be maintained in the chamber after injection and the temperature conditions to which it is subject in the chamber, under all working conditions tends to be adequate to ensure the maintenance of efficient and complete reaction therein, and efficient use of the products of reaction for propulsion purposes.

Such automatic control of the effective cross sectional area of the nozzle passage may be effected by a suitable interconnection between the mechanism controlling the rate of fuel supply to the reaction chamber and the means for varying the effective cross sectional area of the nozzle, or by automatic apparatus responsive to the pressure conditions in the reaction chamber or a combination of the two.

Again the means for varying the effective cross sectional area of the nozzle passage may be such as also to control the relationship between entry and exit area of the nozzle itself so as to promote efficient propulsive use of the products of reaction under all working conditions.

The means for varying the effective cross sectional area of the nozzle passage, which may be in the form of a "bullet" or suitably formed plug-like member extending into or through the nozzle passage, is conveniently operated by servo mechanism and, according to a further feature of the invention this servo mechanism may be of the liquid pressure type and may use for its operating liquid fuel derived from the means for delivering fuel under pressure to the reaction chamber.

In one arrangement the means for supplying fuel to the reaction chamber comprises a pump, for example a centrifugal pump driven by a gas turbine which is arranged to be operated by a proportion of the products of reaction derived from the reaction chamber, and in this case the products of reaction used in the turbine may, after passing therethrough, pass to a subsidiary propulsion nozzle through which they will flow with propulsive effect so as to assist the propulsive effect produced by the ejection of the products of reaction direct from the reaction chamber through the main nozzle passage.

In any case, means responsive to ambient atmospheric pressure may be provided for imposing an additional control on the means for varying the effective cross sectional area of the nozzle passage so as to reduce this cross sectional area with reductions in ambient atmospheric pressure and vice versa, while alternatively or in addition, means responsive to ambient atmospheric pressure may be provided for imposing a control on the quantity of fuel supplied.

Such control of nozzle area and/or fuel may be desirable in order to maintain within the reaction chamber at the higher altitudes a pressure sufficient to maintain efficiency for a given thrust and operation of the fuel pump turbine to provide the required fuel pressure.

In a modification of such an arrangement, a turbine device arranged to be driven by products of reaction taken from the reaction chamber may drive each of two pumps for delivering fuel to the reaction chamber, means being provided for rendering one pump operative and inoperative in accordance with the operating conditions of the unit so as to be operative only when the unit is operating under conditions of or approaching maximum load. In this way unnecessary waste of power under moderate load conditions due to driving pumping apparatus of a capacity much in excess of that needed under such conditions is avoided.

According to a further feature of the invention the nozzle passage, with or without part of the reaction chamber includes a double-walled portion the space between the walls of which constitutes a passage or passages through which fuel is caused to flow before entering the reaction chamber. Moreover where suitable the bullet or plug-like member by which the effective cross sectional area of the nozzle passage can be varied may be formed and arranged so that fuel flows through it on its way to the reaction chamber.

One form of jet propulsion power unit according to the invention is shown diagrammatically by way of example in the accompanying drawing.

In the construction shown, the power unit comprises a reaction chamber A of generally cylindrical form with hemispherical ends $A^1$, $A^2$ from the centre of one, $A^1$, of which leads a main propulsion nozzle B while extending through, $A^2$, the other so as to be coaxial with the main propulsion nozzle B is a tubular guide C in which slides a rod like member $C^1$ having an enlarged head $C^2$, and hereinafter for convenience called a bullet, which extends into and is movable axially in the nozzle B to vary the effective cross-sectional area thereof, that is to say the effective cross-sectional area of the annular nozzle passage between the bullet $C^2$ and the wall of the nozzle B. The arrangement may be such that the bullet B can be withdrawn substantially into the reaction chamber A so as to leave substantially the whole of the cross-sectional area of the nozzle B free for the passage of the products of reaction, the effective cross-sectional area of the nozzle being reduced merely by movement of the bullet towards the nozzle throat or the form of the bullet may be such, as shown, that the bullet $C^2$ has a part $C^3$ extending through the nozzle so that the bullet by movement controls not only the effective cross-sectional area of the nozzle but also the relationship between the free cross-sectional areas of the nozzle passage at different points in its length.

The wall of the nozzle B and of the adjacent part $A^1$ of the reaction chamber are formed double, as shown to provide a passage or passages, hereinafter called jacket passages, for the flow of fuel therethrough for the purpose of cooling the nozzle B and the adjacent part, $A^1$, of the wall of the reaction chamber and simultaneously heating the fuel.

Such jacket passages have a fuel inlet D in the nozzle wall which is fed from a fuel supply passage $D^1$ and serve to deliver fuel to a plurality of fuel injection devices suitably situated about the wall of the reaction chamber as indicated for example at $D^2$, $D^3$, some of such fuel injection devices being arranged to deliver fuel in an upstream direction, as indicated at $D^2$, which is inclined to the major axis of the reaction chamber A while some are arranged to deliver fuel in a downstream direction as indicated at $D^3$, the upstream injection devices being situated in a part of the wall adjacent to the nozzle B while the downstream injection devices are situated nearer the part $A^2$ of the wall.

Selector valves, indicated at E, $E^1$, $E^2$, are associated with the fuel supply passages to enable the injection devices to be selectively brought into operation. Thus in the example shown the injection devices $D^2$ are fed with fuel which has passed through the jacket passages of the nozzle B and the part $A^1$ of the reaction chamber wall by a pipe $E^3$ containing the selector valve E, some of the injection devices $D^3$ are fed with fuel which has also passed through the jacket passages of the nozzle B and apart $A^1$ of the reaction chamber wall by a pipe $E^4$ containing the selector valve $E^1$ while the remaining injection devices $D^3$ are fed with fuel through a pipe $E^5$ containing the selector valve $E^2$.

It is to be understood that for convenience each of the pipes $E^3$, $E^4$, and $E^5$ is shown as feeding only a single injection device $D^2$ or $D^3$ as the case may be but that in practice each of the pipes would normally feed a number of these devices circumferentially displaced from one another about the axis of the reaction chamber A.

Associated with the reaction chamber A is a passage F leading through the part $A^2$ of the wall of the reaction chamber and communicating with an igniter $F^1$, for example of the cartridge type while fuel can be delivered to the igniter passage F by a pipe $F^3$ and injection devices indicated at $F^4$ for the purpose of facilitating initiation of reaction within the reaction chamber when the cartridge starter $F^1$ is "fired." As will be seen the fuel passage $F^3$ may include a part constituted by the space between double walls constituting part of the igniter passage F.

The igniter $F^1$ may be constituted by any conventional ignition device, and the details thereof form no part of the instant invention. A suitable device is shown, for instance, in U. S. Letters Patent to MacDonald 2,627,160, granted February 3, 1953.

The bullet member $C^1$, $C^2$, $C^3$, is connected to the piston G of a hydraulic servo device of the follow-up type by a piston rod $G^1$ passing through glands at the opposite ends of the servo cylinder $G^2$, this servo device including the usual control valve $G^3$ which is arranged to be operated by a control lever $G^4$. In the diagrammatic illustration the piston rod $G^1$ is shown as connected by a lever $G^5$ to a sleeve $G^6$ within which the valve $G^3$ operates and it will be readily understood that this represents a diagrammatic illustration of the well known type of follow up servo device in which for each position of the control valve $G^3$, the piston G has a corresponding position into which it is moved and in which it is maintained.

As indicated the control lever G is connected to the valve through a bellows type evacuated capsule H so that for any given setting of the control lever $G^4$, changes in atmospheric pressure will cause corresponding changes in the position of the control valve $G^3$ and hence of the piston and bullet $C^1$, $C^2$, $C^3$.

The means for supplying fuel to the reaction chamber A and the passage F comprises a reservoir J from which leads a fuel supply passage $J^1$ connected through one branch passage $J^2$ to the inlet of a centrifugal pump $J^3$ and through another branch passage $J^4$ to the inlet of a centrifugal pump $J^5$.

The centrifugal pumps $J^3$, $J^5$ are arranged to be driven through a shaft K from a gas turbine $K^1$ the operating fluid of which is derived through a passage $K^2$ and branch passages $K^3$, $K^4$ from the reaction chamber A while the exhaust from the turbine K passes through a passage $K^5$ to a subsidiary propulsion nozzle $K^6$ through which it is thus delivered with propulsive effect to assist the propulsive effect of the gases passing through the main nozzle B.

The delivery passages of the fuel pumps $J^3$, $J^5$ communicate through passages L, $L^1$ containing non-return valves $L^2$, $L^3$ with a main delivery passage $L^4$ which in turn communicates with the storage space of a pressure accumulator M in which fuel can be stored against a resilient pressure, which in the example shown is a gas pressure maintained in the chamber $M^1$ of the accumulator. Moreover in the example shown the chamber $M^1$ communicates through a passage $M^2$ and a valve $M^3$ with an air bottle or the like $M^4$ so that if desired the pressure in the chamber $M^1$ can be augmented from the air bottle $M^4$ by opening the valve $M^3$. The fuel chamber of the pressure accumulator M also communicates through a passage $M^5$ containing a non-return valve $M^6$ with a source of fuel constituting priming fuel which can thus be delivered under pressure to the passage $M^5$ to charge the storage chamber M of the accumulator with priming fuel if desired for the starting of reaction in the reaction chamber A.

The fuel storage chamber M of the accumulator communicates through a passage N containing a valve $N^1$ with the passage $F^3$, while the passage $L^4$ communicates through a metering orifice O with the passage $D^1$ by which fuel can be supplied to the reaction chamber A. The passage D also communicates through a passage $O^1$ with the valve $G^3$, $G^6$ of the servo device G, $G^2$ so that the fuel constitutes the working fluid for the servo device.

The passages $J^2$, $J^4$, $K^3$ and $K^4$ are controlled by valves P, $P^1$ and $P^2$, $P^3$ while the orifice O is arranged to be controlled by a servo device comprising a piston $O^2$ and the usual valve $O^3$, this valve being controlled through an evacuated capsule $O^4$ from the control lever $G^4$ by a linkage $O^5$ so that its setting depends upon the position of the control lever $G^4$ and atmospheric pressure jointly.

As shown, the working fluid for the servo device $O^2$, $O^3$ controlling the valve O is derived from the passage D and is thus constituted by the fuel.

If desired a control device Q sensitive to the pressure in the passage O may be provided to control the flow through the exhaust passage $K^5$ of the turbine $K^1$ so that flow through this passage is reduced if the fuel pressure in the passage $L^4$ exceeds a predetermined value.

The various valves $M^3$, E, $E^1$, $E^2$, P, $P^1$, $P^2$, $P^3$ and $N^1$ and the igniter $F^3$ are arranged to be electrically controlled through conductors as indicated from a master controller R and an interconnection, diagrammatically indicated at $O^6$ is also provided between the control member $R^1$ of the master controller R and the lever $G^4$.

The operation of the apparatus may therefore be as follows:

The accumulator M is first charged, for example with the priming fuel from the pipe $M^5$ through the non-return valve $M^6$. The master controller R is then moved into its starting position in which it opens the valves $N^1$ and $M^3$ so that the starting fuel is injected through the pipe $F^3$ into the igniter passage F. At the same time the starting cartridge $F^1$ is ignited so that reaction is started in the reaction chamber A at a point adjacent to the igniter passage F. Some of the gases from that reaction pass through the pipe $K^2$ and start the turbine $K^1$ so as to bring the pumps $J^3$ and $J^5$ into operation. The valve P is also opened so that the pump $J^3$ can maintain a supply of fuel through the valve $M^1$ and the injection devices $F^4$ so as to maintain the initial reaction in the reaction chamber A, the bullet $C^1$, $C^3$ at this time occupying a position, such as that shown, such that a temperature and pressure is maintained within the reaction chamber A sufficient to ensure continuation of the reaction initially started as long as fuel is supplied to the chamber. The controller R may then be moved progressively into other positions in which it opens in turn first the valves E then the valves $E^1$ and $P^2$ and then the valves $E^2$, $P^1$ and $P^3$ to permit fuel to be delivered similarly progressively through the injection devices $D^2$, $D^3$ into the reaction chamber A.

It will be apparent that, as the control member $R^1$ of the master controller R is moved progressively into its various positions it causes corresponding movement of the valve $G^3$ and of the valve $O^3$ so that for each position of the control member $R^1$ there is a corresponding position of the "bullet" $C^1$, $C^2$, $C^3$ and of the member controlling the orifice O. It will also be understood that the arrangement will be such that the position thus established and maintained for the bullet $C^1$, $C^2$, $C^3$ and for the control member of the orifice O will always be that suited to the number of injection devices $D^2$, $D^3$ in operation at the time within the reaction chamber A.

Moreover, the design of the turbine $K^1$ will be such that with gas entering it only through the passage $K^2$ it will provide substantially only the power required to cause the pump $J^3$ to deliver sufficient fuel for supplying the injection devices $F^4$ and $D^2$, whereas, when the valve $P^2$ is open, this enables the turbine to supply the additional power to cause the pump $J^3$ to deliver the additional fuel required for the injection devices $D^3$ fed through the valve $E^1$. Similarly, when the valves $P^3$ and $P^1$ are opened, this brings the pump $J^5$ into operation and simultaneously enables the turbine $K^1$ to provide the additional power necessary to drive that pump, thus providing the rate of fuel supply required when all the injection devices $D^3$ are in operation with the devices $F^4$ and $D^2$.

In a typical practical operation, therefore, the pilot of an aircraft incorporating the proplusion apparatus, after charging the accumulator and initiating reaction in the reaction chamber by movement of the control member $R^1$ into its starting position, might move the control member $R^1$ rapidly through the intermediate positions into its last position in which all the injection devices $R^2$ and $R^3$ are in operation the bullet $C^1$, $C^2$, $C^3$ is in the position giving maximum nozzle area and the control member of the orifice O is in its maximum delivery position. The unit would, therefore, operate at maximum output and the pilot would take off and climb to the desired altitude. The pilot would then move the control member $R^1$ into the position in which only the injection devices $D^2$ and $F^4$ are in operation which would cause the unit to operate under "cruising" conditions. If and when the pilot should then wish to operate under "combat" conditions he would move the control member $R^1$ into the position in which the injection devices $D^2$ and $F^4$ and those injection devices $D^3$ which are under the control of the valve $E^1$ only are in operation.

In a modified arrangement, the injection devices $F^4$ might be cut off as soon as the injection devices $D^2$ are brought into operation so that, after reaction has been initiated in the reaction chamber A, reaction is maintained by injection only through whichever of the injection devices $D^2$ and $D^3$ are in operation at any time.

In a further modification the nozzle B may be formed in two longitudinal sections B and $B^1$, the outer section, $B^1$ having a greater expansion rate than the inner one, B, so that under certain operating conditions the effective end of the nozzle is constituted by the end of the inner section B, while under other operating conditions the effective end of the nozzle is the end of the outer section $B^1$.

Thus, with such an arrangement and conditions of moderate mass flow, the sudden change in the expansion rate of the nozzle will encourage break away of the stream of gasses from the bore of the nozzle at the point at which the cone angle changes so that this point constitutes the effective end of the nozzle whereas, at higher rates of mass flow, this break away will not occur so that the expansion continues under the control of the nozzle to the true end of the nozzle.

What we claim by our invention and desire to secure by Letters Patent is:

1. A jet propulsion power unit comprising a reaction chamber, a propulsion nozzle passage leading from one end of the reaction chamber, a "bullet" member extending into and axially movable within the nozzle passage to vary its effective cross-sectional area, a support and guide for said "bullet" member passing through the end of the reaction chamber opposite to the nozzle passage and in which the said "bullet" member can slide axially, a fluid pressure servo device including a servo piston connected to the said "bullet" member for moving it axially, and a servo valve, a plurality of sets of liquid propellant injection devices arranged to inject liquid propellant into the reaction chamber, liquid propellant delivery passages for delivering liquid propellant respectively to the said sets of injection devices, a liquid propellant supply passage including a part formed between double walls of the nozzle passage through which the said liquid propellant passes before passing to the said liquid propellant delivery passage, liquid propellant control valves selectively controlling the delivery of liquid propellant through the said liquid propellant supply passages to the respective sets of injection devices, a pressure accumulator, means for charging the pressure accumulator with reaction liquid before the propulsion unit is put into operation, a valve controlling the flow of reaction liquid from the pressure accumulator to a further set of reaction liquid injection devices, a starter device for initiating reaction in the reaction liquid delivered through the said further set of reaction liquid injection devices, a gas turbine, means for delivering working fluid in the form of products of reaction from the reaction chamber to the gas turbine, valve means controlling the rate of supply of working fluid to the gas turbine, two liquid propellant pumps driven by the gas turbine, a source of liquid propellant, valve means selectively controlling the supply of liquid propellant from the said source to the two pumps, while the two pumps deliver liquid propellant to the liquid propellant supply passage, a controllable metering orifice controlling the rate of liquid propellant delivery through said liquid propellant supply passage, a master controller controlling the valves and an interconnection between the master controller, the servo valve and the variable orifice device, the arrangement being such that movement of the master controller causes selective opening of the valves controlling the supply of liquid fuel to the injection devices and of the valves controlling the supply of liquid propellant to the pumps and the supply of working fluid to the turbine simultaneously with variations in the settings of the servo valve and of the variable orifice device in such manner that as additional liquid propellant control valves are opened the "bullet" is moved progressively to increase the cross-sectional area of the nozzle passage, the supply of working fluid to the turbine is progressively increased correspondingly, and the supply of liquid propellant to the said pumps is selectively controlled so that while said two pumps are in operation under maximum output conditions one pump only is in operation under conditions substantially below maximum output conditions.

2. A jet propulsion power unit as claimed in claim 1, in which the master controller is arranged to control the valve means for permitting liquid propellant to be delivered from the pressure accumultor to the appropriate injection devices and has a starting position in which it opens said valve means and simultaneously causes operation of the starter device to initiate reaction in the liquid propellant thus delivered and the arrangement is such that if the master controller is maintained in its starting position after the pressure accumulator is exhausted, liquid propellant will continue to be delivered to the said appropriate injection devices by the appropriate one of the said liquid propellant pumps at least until the master controller is moved into a position to bring further injection devices into operation.

References Cited in the file of this patent
UNITED STATES PATENTS

| | | |
|---|---|---|
| 2,395,406 | Goddard | Feb. 26, 1946 |
| 2,433,932 | Stosick | Jan. 6, 1948 |
| 2,433,943 | Zwickey et al. | Jan. 6, 1948 |
| 2,531,761 | Zucrow | Nov. 28, 1950 |
| 2,552,231 | Streid et al. | May 8, 1951 |
| 2,565,854 | Johnstone et al. | Aug. 28, 1951 |
| 2,585,626 | Chilton | Feb. 12, 1952 |
| 2,637,973 | Lawrence | May 12, 1953 |
| 2,689,452 | Jordan | Sept. 21, 1954 |
| 2,780,914 | Ring | Feb. 12, 1957 |